United States Patent
Bauman et al.

[11] Patent Number: 6,055,607
[45] Date of Patent: *Apr. 25, 2000

[54] INTERFACE QUEUE WITH BYPASSING CAPABILITY FOR MAIN STORAGE UNIT

[75] Inventors: Mitchell A. Bauman, Circle Pines; James L. Federici, Shoreview, both of Minn.

[73] Assignee: Unisys Corporation, Blue Bell, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,717

[22] Filed: Dec. 23, 1996

[51] Int. Cl.⁷ .............................. G06F 12/00; G06F 13/00
[52] U.S. Cl. ........................ 711/138; 711/113; 711/154; 711/158; 710/52
[58] Field of Search ...................................... 711/113, 130, 711/138, 148, 151, 154, 158; 395/872, 873, 874, 875, 876, 877

[56] References Cited

U.S. PATENT DOCUMENTS

| | | | |
|---|---|---|---|
| 4,627,018 | 12/1986 | Trost et al. | 711/149 |
| 4,682,284 | 7/1987 | Schrofer | 395/875 |
| 4,722,046 | 1/1988 | Kasrazadeh et al. | 711/140 |
| 4,835,672 | 5/1989 | Zenk et al. | 711/151 |
| 4,843,543 | 6/1989 | Isobe | 711/148 |
| 5,073,871 | 12/1991 | Uchida | 711/151 |
| 5,140,682 | 8/1992 | Okura | 711/130 |
| 5,224,214 | 6/1993 | Rosich | 395/859 |
| 5,361,368 | 11/1994 | Herzl et al. | 395/200.7 |
| 5,375,223 | 12/1994 | Meyers et al. | 711/151 |
| 5,517,660 | 5/1996 | Rosich | 711/117 |
| 5,557,744 | 9/1996 | Kobayakawa et al. | 395/200.62 |
| 5,617,575 | 4/1997 | Sakakibara et al. | 395/800.34 |
| 5,649,157 | 7/1997 | Williams | 711/151 |

*Primary Examiner*—Tuan V. Thai
*Attorney, Agent, or Firm*—Beth L. McMahon; Charles A. Johnson; Mark T. Starr

[57] ABSTRACT

A method of interfacing multiple requests using a request hold register, a multiplexer and a snapshot register with multiple requests directed into both the request hold register and a multiplexer which prevents forwarding the requests to the snapshot register if the snapshot register is not in a receiving condition but if the snapshot register is in a receiving condition allows the request to immediately enter snapshot register without having to wait for the next clock cycle.

12 Claims, 3 Drawing Sheets

INTERFACE QUEUE WITH BYPASSING CAPABILITY FOR MAIN STORAGE UNIT

FIELD OF THE INVENTION

This invention relates generally to an interface queue and more specifically to an interface queue for interfacing multiple segment requests between an independent second level cache and a main storage interface.

BACKGROUND OF THE INVENTION

One of the methods of handling multiple requests from an independent second level cache to a single main storage interface utilizes dedicated lines. Another method uses a system of multiple queues that route and reroute the requests until the requests can be sent to the main storage interface. The present invention is a cost effective way to enhance the performance of the system as well as decreasing the processing time for handling the requests to the main storage interface. The present invention provides a request hold register, a snapshot register and a multiplexer that under certain conditions allows certain requests to bypass the request hold register and go directly to the snapshot register thereby eliminating a clock cycle in the processing of the requests. The bypassing of the request hold register under certain conditions not only is less costly than systems used by the prior art, but it also minimizes the process time to transfer by permitting the transfer of requests. The priority logic determines the order that the requests in the interface queue are processed.

SUMMARY OF THE INVENTION

Briefly, the present invention comprises an interface queue and a method of interfacing multiple requests using a request hold register, a multiplexer and a snapshot register with multiple requests directed into both the request hold register and a multiplexer which prevents forwarding the requests to the snapshot register if the snapshot register is not in a receiving condition. If the snapshot register is in a receiving condition, it allows the request to immediately enter snapshot register without having to wait for the next clock cycle.

DESCRIPTION OF THE PREFERRED EMBODIMENT

Figure 1:
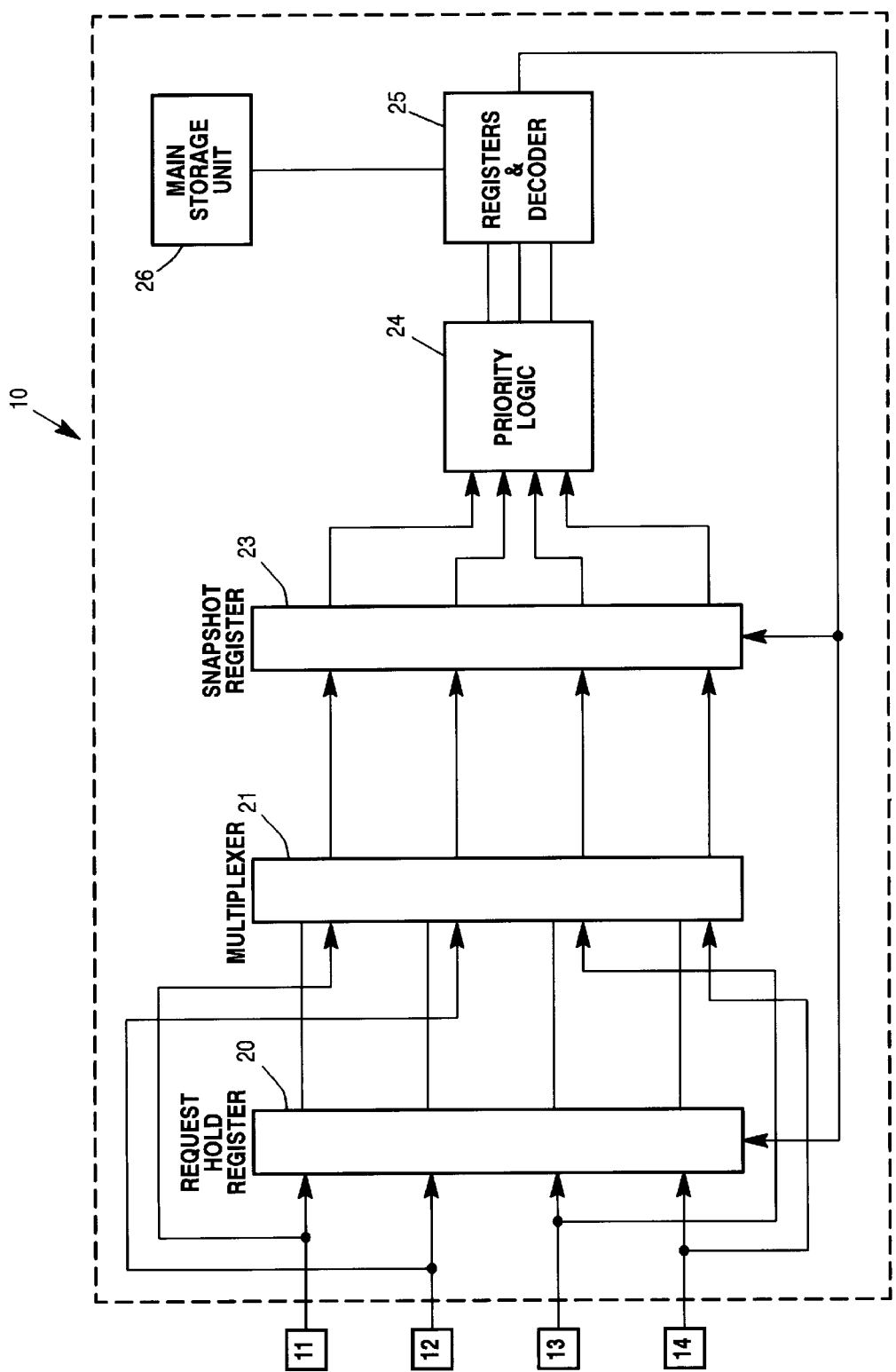
FIG. 1 shows in block form the request hold register, multiplexer and snapshot register for expedited procession of requests together with the priority logic and registers and decoders for clearing the request hold register.

Referring to FIG. 1, reference numeral 10 identifies the interface queue which comprises a portion of a chip for expedited handling of multiple requests between a processor and a main storage unit (MSU) 26. The present invention includes a request hold register 20, a multiplexer 21, and a snapshot register 23. Priority logic 24 determines the order of handling the request through the system and registers and decoders 25 to clear the registers 20 and 23 to allow the interface queue to handle additional requests.

For illustration purposes, the interface queue 10 is shown with four independent segments 11, 12, 13 and 14 from a second level cache which can present either a read request or a write request to the interface queue 10. The priority logic 24 is used to determine which of the signals will receive priority. In interface queue 10, the read requests are given priority over the write requests, and the segments are given priority based on the number of the segment request. That is, segment 11 is given priority over segment 12, segment 12 is given priority over segment 13, and segment 13 is given priority over segment 14. The registers and decoder 25 allow the registers in interface queue 10 to be cleared to allow for further processing of requests.

Request hold register 20 holds up to four requests (one for each segment) until the snapshot register 23 is in a receiving mode. The requests are than directed into the snapshot register 23. The snapshot register 23 then directs the requests to the main storage unit 26 in accordance with direction from the priority logic 24. During the time interval the snapshot register is in a non-receive mode, multiplexer 21 prevents further requests from being sent to the snapshot register 23. That is, multiplexer 21 prevents further requests from entering the snapshot register 23 while requests are being processed by the snapshot register 23. Thus the non-receive mode of the snapshot register 23 is determined by the multiplexer 21. After the snapshot register 23 receives the requests, all the requests in the snapshot register 23 are prioritized and handled before the multiplexer 21 allows the snapshot register 23 to receive any new requests. This ensures that the low priority requests in the snapshot register 23 will be handled before any later higher priority requests, thus ensuring that the high priority requests do monopolize the MSU 26 by continually making requests that are serviced first.

Although the dual latch system assures access to the low priority request, the dual latch system can waste time. For example, if a request is made when the snapshot register is empty, the request is first captured in the request hold register and than transferred to the snapshot register 23 on the next clock cycle. With the present invention, the multiplexer 21 directs requests directly into the snapshot register 23 if the snapshot register is empty thus eliminating the need to wait for the next clock cycle.

Figure 2:
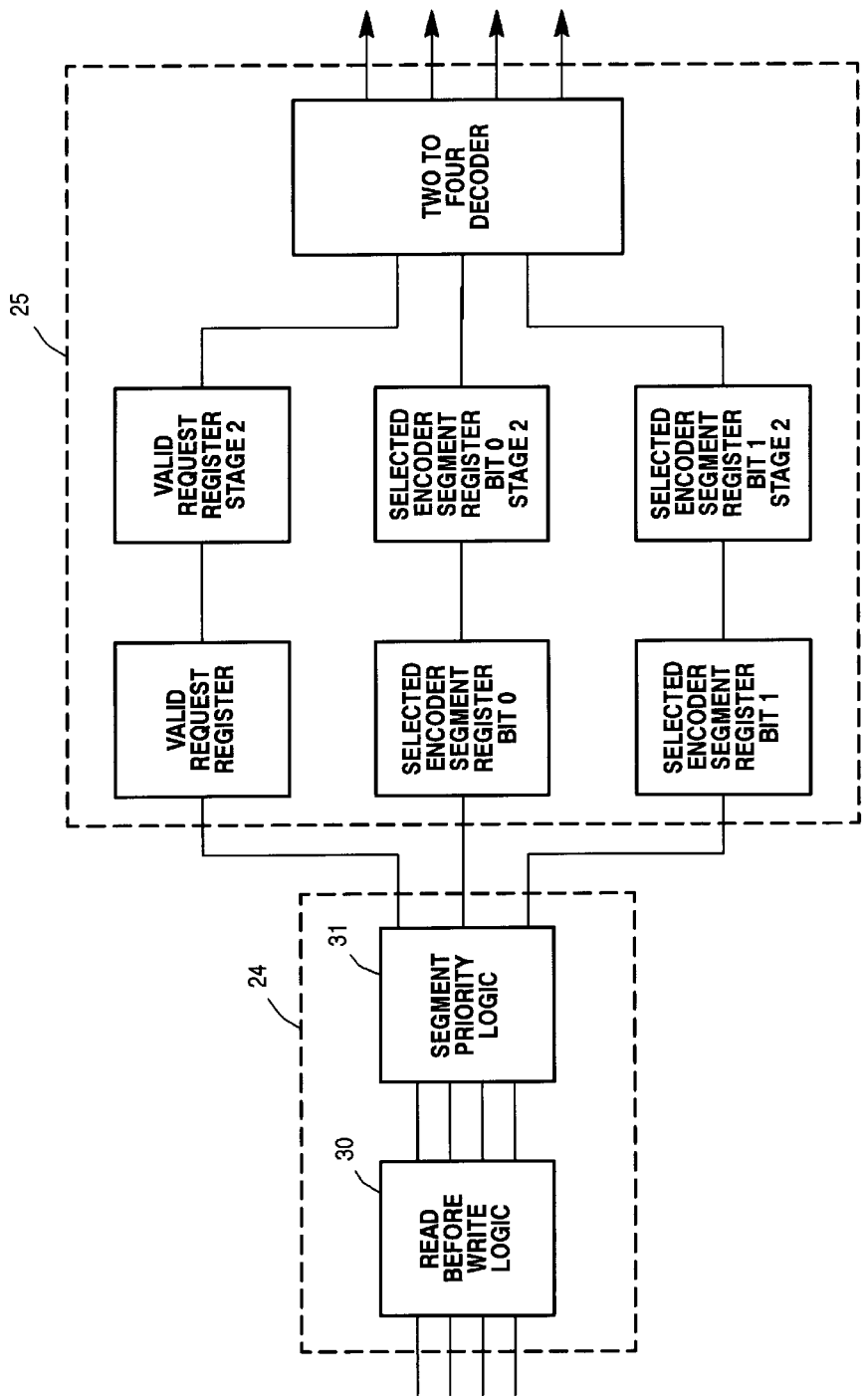
FIG. 2 shows in block form the logic for prioritizing the requests and the registers for handling the requests and clearing the registers once the requests have been handled.

Referring to FIG. 2, the interface queue 10 priority logic 24 includes read before write priority logic 30 and segment priority 31. Read before write priority logic 30 ensures that any read requests in the snapshot register 23 arc handled before any write requests in the snapshot register 23. The segment priority logic 31 prioritizes the requests by the segments. That is, segment 11 is handled before segment 12, segment 12 is handled before segment 13; and segment 13 is handled before segment 14. Thus the interface queue 10 provides for expedited handling of requests by allowing a request to go directly into the snapshot register 23 if the snapshot register 23 is open and the priority logic 24 prioritizes the handling of the requests according to a predetermined order.

To illustrate the operation of the interface queue 10 with a single read request present in segment 11, reference should be made to FIG. 1 and Table 1. In this condition, a read request in segment 11 is sent to the request hold register 20 and to the multiplexer 21. If the snapshot register 23 is in the transmit or non-receive mode the multiplexer 21 prevents the read request from being sent to the snapshot register 20 until a clear signal is sent from the priority logic 24 to clear the snapshot register 23 and the requests hold register 20.

Table 1 illustrates what happens to the request when the snapshot register 23 is in the transmit or non-receive mode and Table 2 illustrates what happens to three request that arrive during when the snapshot register is in a receive mode and a fourth request that arrives at a later time when the snapshot register is in the non-receive mode.

TABLE 1

| Segment | Request | Snapshot Register (non-receive mode) |
|---|---|---|
| 11 | Read | Multiplexer prevents read request from being sent to snapshot register |
| 12 | none | Multiplexer prevents requests from being sent to snapshot register |
| 13 | none | Multiplexer prevents requests from being sent to snapshot register |
| 14 | none | Multiplexer prevents requests from being sent to snapshot register |

TABLE 2

| Segment | Request | Snapshot Register (receive mode) |
|---|---|---|
| 11 | Read | Multiplexer allows read request to go directly into snapshot register |
| 12 | Write | Multiplexer allows write request to go directly into snapshot register |
| 13 | Delayed Write | Multiplexer prevents write request from entering snapshot register |
| 14 | Read | Multiplexer allows read request to go directly into snapshot register |

Figure 3:
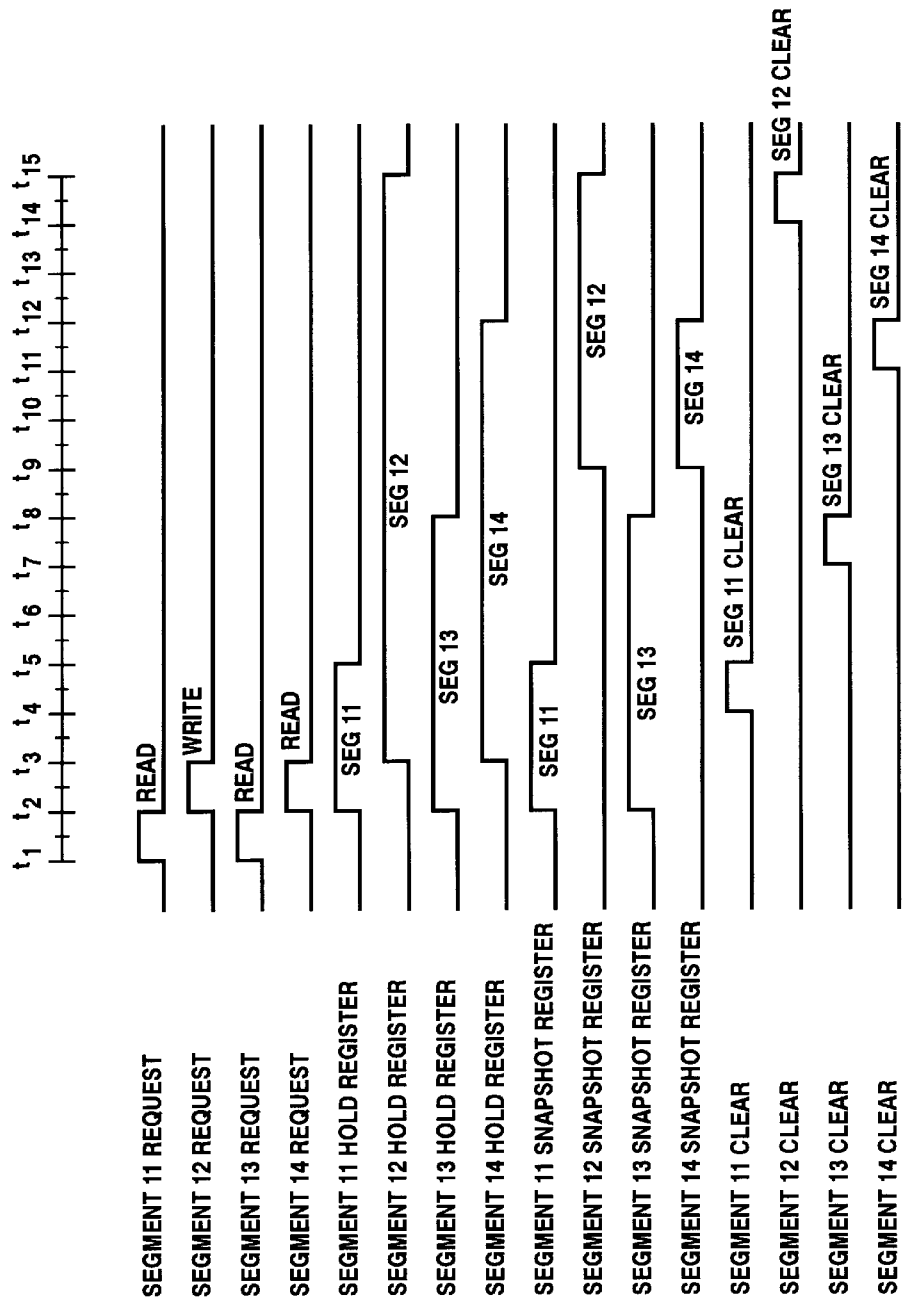
FIG. 3 shows a portion of a timing diagram illustrating the status of the request at various time intervals with the snapshot register initially in an empty condition.

To illustrate how interface queue 10 handles multiple requests, reference should be made to FIG. 3 which shows a portion of a timing diagram illustrating the status of the request at various time intervals, with the snapshot register 23 initially in an empty condition. The left column identifies the four segments, the hold register 20, the snapshot register 23 and the clear signals with the graph indicating the status of each segment request at different time intervals in the hold register 20, the snapshot register 23 as well as the segment clear signals that allow the snapshot register to process additional requests.

FIG. 3 shows that two read requests have been presented by segment 11 and segment 13 register at a time $t_1$. At time interval $t_2$ a write request is presented by segment 12 and a read request is presented by segment 14.

Referring to hold register 20, FIG. 3 shows the read request in segment 11 is transferred to hold register 20 and the read request from segment 13 is also transferred to hold register 20. As the snapshot register 23 is empty, multiplexer 21 allows the read request in segment 11 to enter snapshot register 23 and the read request from segment 13 to enter snapshot register 23.

At the time interval $t_2$, the snapshot register 23 contains two requests for handling. As requests from segment 12 and segment 14 came at a later time, the multiplexer 21 prevents routing of additional requests to the snapshot register 23 until the requests in the snapshot register 23 are acted on. Consequently, write request from segment 12 which entered the interface queue 10 at later time $t_2$ is directed into hold register 20 and the read request from segment 14 which entered the interface queue 10 at later time $t_2$ is directed into hold register 20 at time $t_3$. The Figure shows that, the snapshot register 23 does not receive the requests from segment 12 and segment 14 as multiplexer 21 prevents the later requests from segment 12 and 14 from being routed to snapshot register 23 until the requests in snapshot register 23 are executed.

The execution of the requests in snapshot register 23 are handled by priority logic 24 which prioritizes the requests by handling read requests before write requests and segment 11 requests before segment 13 requests.

At the time interval $t_3$, FIG. 3 shows the hold register 20 contains all the requests from segments 11, 12, 13 and 14 while the snapshot register 23 contains only the requests from segment 11 and segment 13. Because the priority logic 24 handles read requests before write requests and segment 11 requests before segment 13 requests, the request from segment 11 is executed first. The execution of segment 11 request causes the register and decoder 25 to execute the request from segment 11 and to also send a clear signal to hold register 20 and snapshot register 23.

At the time interval $t_5$, FIG. 3 shows that the segment 11 request in both the snapshot register 23 and the hold register 20 are executed thus clearing the hold register 20 to receive additional requests. Next, the request from segment 13 in snapshot register 23 is executed. Execution of the request from segment 13, causes the register and decoder 25 to send a clear signal to hold register 20 and snapshot register 23 to clear the segment 13 request at time interval $t_8$ therefrom.

Once the requests in snapshot register 23 have been cleared, the multiplexer 21 allows the snapshot register 23 to receive the requests from segments 12 and 14. A reference to time $t_9$ shows that the requests from segment 12 and 14 are routed into snapshot register 23 where they are handled according to the priority logic 24. That is the read request from segment 14 is handled before the write request from segment 12 as priority logic 24 gives read requests higher priority than write requests.

FIG. 3 shows that at time $t_{12}$, the request from segment 14 which is in snapshot register 23 is executed and a segment clear signal is sent from the register and decoder 25 to hold register 20 and snapshot register 23 to clear the segment 14 requests therefrom. Once the segment 14 request is processed, the segment 12 request is processed. FIG. 3 shows that at time $t_{15}$ the segment 12 request in snapshot register 23 and in hold register 20 are cleared by a signal.

Thus, with the present invention, it is apparent the requests from the segments 11, 12, 13 and 14 do not have to be first latched into the hold register 20 and then into the snapshot register 23 if the snapshot register 23 is empty. With snapshot register 23 empty, the multiplexer 21 directs simultaneously requests from the segments into both the snapshot register 23 and the hold register 20 thus eliminating the wait for an additional clock cycle to transfer the requests into the snapshot register 23.

We claim:

1. An interface queue for transferring requests from requesting units to a main storage unit comprising:
   a request hold register to store one or more of the requests received from any of the requesting units until the requests can be processed;

a snapshot register, said snapshot register having a request receive mode that allows all requests to be transferred from said request hold register to said snapshot register only when the snapshot register is empty and is in said request receive mode, said snapshot register further having a request non-receive mode to store the previously received requests in the snapshot register until all said previously received requests are transmitted to the main storage unit according to a predetermined priority scheme and before the snapshot register receives additional requests; and a bypass circuit coupled to said snapshot register and to said request hold register to allow transmission of any of the requests directly from the requesting units to the snapshot register when the snapshot register is in said request receive mode and said request hold register no longer stores any of said one or more of the requests.

2. The interface queue of claim 1 including priority logic coupled to said snapshot register to prioritize the order of transmission of requests through the interface queue according to the predetermined priority scheme.

3. The interface queue of claim 2 wherein ones of the requests are read requests and others of the requests are write requests, and wherein said priority logic handles the read requests before the write requests.

4. The interface queue of claim 3 wherein the requests are each associated with a respective segment designator, and wherein said priority logic further handles requests by a prearranged segment order as determined by said segment designator.

5. A request priority system to provide requests received from multiple requesting units to a shared resource, comprising:

a request hold storage device to store all pending requests provided by the multiple requesting units that are each requesting access to the shared resource;

a snapshot storage device coupled to receive all pending requests stored in said request hold storage device at a predetermined instant in time, and to provide all received requests to the shared resource for processing prior to again receiving said all pending requests stored in said request hold register; and a bypass circuit coupled to the snapshot register to allow said snapshot storage device to receive requests directly from the multiple request units instead of said request hold storage device when said request hold storage device is not storing any requests.

6. The request priority system of claim 5, wherein said bypass circuit includes a selector to provide said all pending requests from said request hold storage device to said snapshot register when said request hold storage device is not empty, and to provide requests directly from the multiple requesting units when said request hold storage device is empty.

7. The request priority system of claim 5, and further including a priority circuit coupled to receive said all received requests from said snapshot storage device and to provide said all received requests to the shared resource for processing according to a predetermined priority scheme.

8. The request priority system of claim 7, wherein ones of the requests received from the multiple requesting units are read requests and other ones of the requests are write requests, and wherein said priority circuit includes circuits to handle read requests before write requests.

9. For use in a data processing system including multiple requesting units and a shared resource, the multiple requesting units generating requests to access the shared resource, the data processing system including a request hold storage device and a snapshot storage device each for storing the requests generated by the multiple requesting units, a method of providing the requests from the multiple requesting units to the shared resource, comprising the steps of:

a.) storing in the request hold storage device at predetermined time intervals all requests that are pending from the multiple requesting units;

b.) transferring all of the requests stored in the request hold storage device to the snapshot storage device;

c.) processing all of the requests stored in the snapshot storage device; and d.) transferring any additional ones of the requests stored in the request hold storage device to the snapshot storage device after all requests stored in the snapshot storage device have been processed in step c.), and if no requests are stored in the request hold storage device, transferring requests directly from the multiple requesting units to the snapshot storage device.

10. The method of claim 9, and further including the step of repeating steps c.) and d.) while the multiple requesting units are making requests.

11. The method of claim 9, wherein said processing step includes the step of providing the requests stored in the snapshot storage device to the shared resource according to a predetermined priority scheme.

12. The method of claim 11, wherein the generated requests include read and write requests, and wherein said providing step includes the step of providing said read requests to the shared resource prior to providing said write requests to the shared resource.

* * * * *